(No Model.)
J. J. ENDRES.
MECHANISM FOR OPERATING CABLE CAR GRIPPING AND BRAKING DEVICES.
No. 347,781. Patented Aug. 24, 1886.
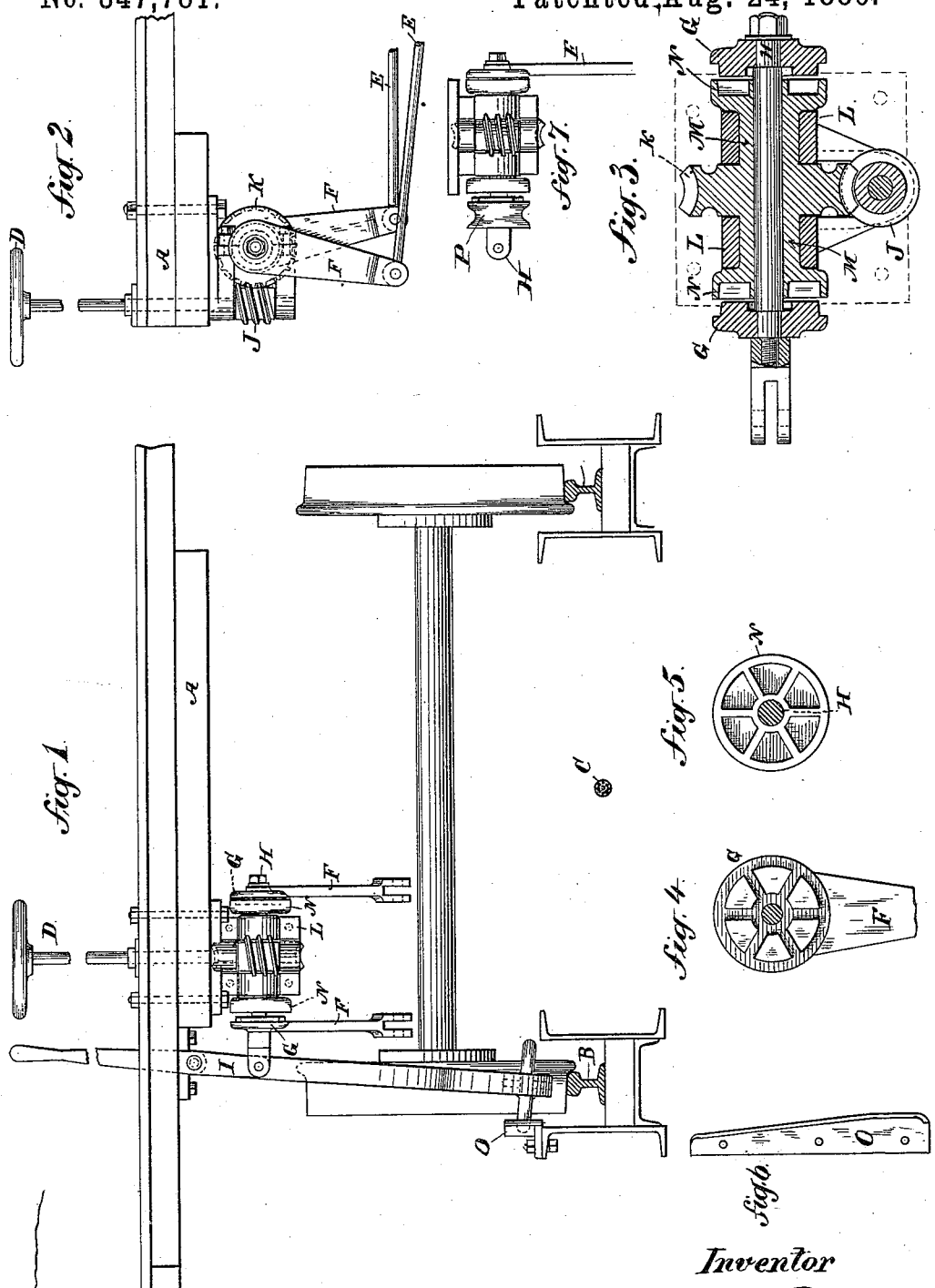
Witnesses:
Inventor
John J. Endres

UNITED STATES PATENT OFFICE.

JOHN J. ENDRES, OF NEW YORK, N. Y.

MECHANISM FOR OPERATING CABLE-CAR GRIPPING AND BRAKING DEVICES.

SPECIFICATION forming part of Letters Patent No. 347,781, dated August 24, 1886.

Application filed January 25, 1886. Serial No. 189,598. (No model.)

*To all whom it may concern:*

Be it known that I, JOHN J. ENDRES, of New York, in the county of New York and State of New York, have invented certain new and useful Improvements in Mechanisms for Operating the Braking and Gripping Devices of Cable-Road Cars, of which the following is a full, clear, and exact description, reference being had to the accompanying drawings.
The invention relates to mechanism adapted to operate both the braking and the cable-gripping devices of cable-road cars. It has for its object to put these devices under the control of one operator, so that they may be conveniently and readily worked from one point (usually at either or both ends of the car) and by the same hand-wheel or other hand mechanism.

The invention consists in combining with the operator's hand-wheel a coupling-hub having two coupling parts or faces, combined with a shifting coupling mechanism arranged so that at the will of the operator the hand-wheel may be connected with either the braking or the gripping device for the purpose of operating the same.

The invention is illustrated in the drawings accompanying this description, Figure 1 being a cross-section of a cable-road track, and showing an end platform of a car with the coupling mechanism of the invention attached thereto. Fig. 2 is a side view of the same mechanism. Fig. 3 is a section on a horizontal plane through the axis of the same. Figs. 4 and 5 show the opposite faces of the clutching parts. Fig. 6 shows a plan view of an incline bar for automatically releasing the gripping devices, and Fig. 7 shows a modification of the coupling.
In these views, A represents the body, platform, or other part of a car to which the devices are attached.

B indicates the track-rails; C', the truck-wheels, and C the cable in its normal position disengaged from the car.

D is a common form of hand-wheel for controlling the gripping and braking mechanisms, and E E are the rods which run to such mechanisms, while F F are arms by which such rods and such mechanisms are operatively connected with the hand-wheel. These arms F are provided at their upper ends with clutch-disks G, and hang loosely, when not in operation, on the central shifting-rod, H, which is attached to the lower end of the hand-lever I, pivotally attached to the car-platform and extending up to within the reach of the operator of the hand-wheel D.

J is a worm fast on the lower end of the hand-wheel shaft, and K is a gear engaging with such worm and hung in the brackets L, secured to the car, and turning within said brackets, as also on the rod H, which passes centrally through the hub M of said gear. The hub M bears on its outer ends the clutch halves or faces N, which correspond to and are adapted to engage with the clutch-disks G on the arms F.

The operation of the mechanism is this: After the cable has been lifted to position for the gripping jaws attached to the car to close upon it, the car-conductor or other operator at the hand-wheel moves the hand-lever so as to bring that one of the clutch-disks whose arm is connected with the gripping mechanism into engagement with the clutch-half of the gear-wheel, and thus forms an operative connection between the hand-wheel and the cable gripping mechanism. Turning the hand-wheel now closes the gripping mechanism and puts the car in motion, the grip being held closed by the worm on the hand-wheel, or, if necessary, by additional means—such as a common ratchet-catch on the hand-wheel, or other like means. When it is desired to open the grip, it is only necessary to release the hand-lever, which disconnects the gripping clutch-disk from the coupling, and permits the grip to open and loose the cable. When, however, it is desired to brake the car, the hand-lever will be first moved to ungrip the cable and then to engage the clutch-disk of the braking-mechanism arm, so that upon now turning the hand-wheel the brakes of the car will be brought into action and the car stopped. By these means a very simple, sure, and effective mechanism is made to serve for both gripping the cable and braking the car, and without imposing upon the operator of the car (as is commonly the case) the necessity of constant attention to the condition or operation of the mechanism controlling the car. The operator has but to set the hand-lever at the proper position and then turn the hand-wheel, and always in the same direction; and it will be noticed it is impossible to call into action either mechanism operated by the hand-wheel without disconnecting the other, and so rendering impossible the working of both devices at the same time; also, that the operator cannot throw the load of the cars upon the cable too suddenly, for even with rapid operation of the hand-wheel the action of the gripping jaws will be to take the cable gradually.

O, Fig. 1, is an incline bar fixed to the track and arranged in such position as to be in path of the lower end of the hand-lever when it is set to hold the cable gripped. This incline will be at such place or places on the track where the cable should be released, and will act to automatically release it, if the operator neglects to release it, by forcing the lower end of the hand-lever inward as the car passes along, thus shifting the gripping clutch-half from operative connection with the hand-wheel.

P, Fig. 7, shows a drum arranged upon the shifting-rod of the coupling, which drum may be used where a chain connection between the grip or the brakes and the coupling is preferred.

I am aware that the invention may be embodied in mechanism differing somewhat in form from that here described, and accordingly I do not limit myself to any specific form.

What is claimed as new is—

1. In combination with the gripping and braking connections of a cable-road car, a coupling-hub provided with two coupling parts or faces, and coupling-disks attached to the gripping and braking connections, and mounted upon shifting supports adapted to engage either of said disks with said hub, substantially as and for the purpose described.

2. In combination with the gripping and braking connections of a cable-road car, a coupling-hub provided with two coupling parts or faces, coupling-disks attached to the gripping and braking connections, and mounted upon shifting supports adapted to engage either of said disks with said hub, and at the same time to disengage the other of said disks therefrom, and hand mechanisms attached to said hub and to said shifting devices for operating the same, substantially as and for the purpose described.

3. In combination, the connections E, the clutch-disks G, attached to the lever I, the gear K, provided with clutch halves N, and the hand-wheel D, provided with the worm J and meshing with said gear, all substantially as and for the purpose set forth.

4. In combination, the connections E, the clutch-disks G, attached to lever I, the gear K, provided with clutch-halves N, the hand-wheel D, provided with worm J, and the incline bar O, all substantially as set forth.

5. In a coupling mechanism for operating the braking and gripping devices of a cable-road car, the combination of the bracket L, supporting the gear K, with its hub and clutch-halves N, and the shifting-rod H, passing centrally through the gear K and its hub, substantially as described.

JOHN J. ENDRES.

Witnesses:
HENRY EICHLING,
A. G. N. VERMILYA.